Patented June 24, 1952

2,601,661

UNITED STATES PATENT OFFICE 2,601,661

COLORED EMULSIONS FOR COLORING TEXTILE FABRICS

Roy H. Kienle and Alfred L. Peiker, Bound Brook, N. J., assignors to American Cyanamid Company, New York, N. Y., a corporation of Maine No Drawing. Application October 4, 1947, Serial No. 778,036

7 Claims. (Cl. 260—15)

This invention relates to a textile printing or dyeing composition of the oil-in-water type and to methods of preparing such compositions.

One of the important recent developments in the coloring art as applied to textile and similar fabrics is the use of the so-called emulsions.

Many advantages have resulted, notably savings in color, sharp prints, the use of pigments and other coloring matter which cannot ordinarily be dyed into fabrics, and the like. Despite the many important advantages of emulsion coloring, there have been certain draw-backs.

Emulsion coloring compositions of the past have been emulsions both of the oil-in-water type and of the water-in-oil type, but in each case the film forming substituents and the color have been dispersed in the oil phase. This has required the use of oil-soluble film-forming components and also usually required the use of oils of high solvency which are relatively expensive and which have shown undesirable action on certain synthetic fibers such as cellulose acetate and vinyl halide acetate copolymers which are soluble or swollen by the high solvent organic oils used.

When an oil-in-water emulsion is used with the pigment dispersed in oil, a relatively large amount of the solvent is required in order to obtain satisfactory body and in spite of the technically excellent results which can be obtained with emulsions of this type on fabrics capable of resisting the action of the solvent, cost has been a severe factor.

According to the present invention oil-in-water emulsions are prepared in which the inner oil phase consists of an oil which is volatilizable at the temperatures used in setting or curing the film forming substance, and said oil phase constitutes from 4.5 to 70% of the total emulsion; and all of the film forming constituents and color constituents are dissolved or dispersed in the continuous aqueous phase of the emulsion. Since the only function of the oil is to produce a satisfactory body and to prevent overdue stiffening of the print or dyed fabric, any organic liquid may be used which does not dissolve the film forming constituents and which has an adequately high vapor pressure at the temperatures at which the film forming substance is cured or set so that when a print is made and cured the oil droplets will largely volatilize. This prevents the formation of a continuous film of the film forming substances which would bridge from fiber to fiber of a textile fabric and produce an unduly stiff hand. As the curing temperature will vary to some extent with the film forming substance used and with the method of curing, that is to say, whether by long continued drying at lower temperature or rapid curing at a somewhat higher temperature which will still fail to injure the fabric, the choice of oil will vary and, of course, an oil of satisfactory high vapor pressure under the conditions of curing must be used. Because of the fact that the oil merely needs to be inert, cheap organic liquids such as petroleum fractions which have low solvent power for the film forming substance may be used. This greatly decreases the cost of the emulsions of the present invention, renders them suitable for use with synthetic fibers which are attacked by highly solvent oils, and in general presents important savings. However, other oils may be used such as certain esters, halogenated hydrocarbons, nitro-paraffins, and the like, and it is an advantage of the present invention that the choice of oil is practically unlimited except for the requirement that it have adequate vapor pressure at the temperature which is to be used for curing the filmforming substances.

While the curing temperatures vary, they fall for the most part within the range from 50° C. to not over 200° C. The oil to be used in the inner phase should have a high vapor pressure at some temperature within this range, the particular temperature depending on the conditions of curing. It is also desirable to have the boiling point of the oil sufficiently above curing temperature so that it will not boil out before the film forming substance has begun to cure sufficiently to prevent formation of a continuous film. This renders certain oils suitable with some curing temperatures and not with others.

Another valuable practical advantage of the present invention is that all of the film-forming substituents are in aqueous solution and therefore equipment in which the emulsions are to be used can be cleaned with water instead of with more expensive solvents.

Oil-in-water emulsions of the present type cannot be practically prepared merely by dissolving the film-forming material and dissolving the color in the water phase. The emulsions thus obtained are not satisfactory as to stability and coloring or printing characteristics. It is necessary to use in the water phase a sufficient amount of hydrophilic colloid to confer stability on the emulsion. The hydrophilic colloid must be compatible with the film-forming substances used and as the film-forming substances are substances well known so are the hydrophilic colloids therewith. Typical hydrophilic colloids are methyl cellulose, carboxymethyl cellulose, alkaline caseinates, alkaline alginates, polyvinyl alcohol, starch, gum tragacanth, polyacrylates and the like. It should be noted that some of the hydrophilic colloids enumerated above are in rather strongly alkaline solutions notably the caseinates and the alginates. These colloids cannot be employed with film-forming substances which are cured under acid conditions. For example, some urea-formaldehyde and triazine aldehyde resins have associated with them an acid catalyst to accelerate curing. In emulsions containing film-forming substances of this nature, caseinates and alginates cannot be used as the acid conditions precipitate and destroy their hydrophilic colloid nature.

The hydrophilic colloids also act as plasticizers, it having been found that any hydrophilic colloid which is compatible with a given film forming substance will also exert plasticizing action thereon. This is of advantage because the films formed are less brittle and additional flexibility is imparted to the fabric.

Hydrophilic colloids which are compatible with synthetic resins have been found to enter into the curing so that the film formed after curing is not soluble in water. The exact mechanism is not known in every case, and it is not intended to limit the present invention to any theory. It seems probable that in some cases the hydrophilic colloid may react with the film-forming substances but that probably in most cases it is present in solid solution therein.

In the case of most emulsions best results are obtainable when suitable emulsifying agents are present in small quantities. The emulsions of the present invention are no exception, and it is an advantage that the conventional emulsifying agents for producing oil-in-water emulsions may be used in preparing the emulsions of the present invention. It should be noted that certain of the hydrophilic colloids, such as for example, methyl esters of cellulose, alkylolamine oleates and the like, also have emulsifying properties. When these colloids are used they may constitute part or all of the emulsifying agent required.

While the compatible hydrophilic colloids which are an essential feature of the present invention in general also exert plasticizing action and produce less brittle films on curing, the invention is not limited to the use of the hydrophilic colloids as the only plasticizers. On the contrary where desired, additional plasticizers for the film forming substances may be used regardless of whether or not they are hydrophilic colloids.

The amount of hydrophilic colloid and its nature will depend on the particular film-forming substance or substances used and to a lesser extent on the nature of the oil phase in the emulsion. It is an advantage of the present invention that emulsions of almost any water-soluble or water-dispersible film-forming substances can be used which are capable of curing or converting by means of heat, oxygen, catalyst or the like. Preferably water-dispersible oxygen or heat-convertible synthetic polymers are employed among which are the water-soluble aminoplasts such as water-soluble urea formaldehyde condensation products and the like. Mixtures may be employed where the resins are not mutually compatible. In general, practically all of the resins require some degree of heat for curing. Theoretically, resins convertible by oxygen or by catalyst at room temperature could be used but the curing time of such resins is normally so long that their use in emulsions for coloring and printing textile or other fabrics is not feasible.

In general, the urea and triazine aldehyde resins which form some of the technically best emulsions of the present invention require the presence of an acid catalyst to enable rapid curing at moderate temperatures. When such aminoplastics are used in emulsions of the present invention, they restrict considerably the nature of the hydrophilic colloid which can be used because it must be capable of forming a stable emulsion in the presence of the acid and it must itself be transformed into water-insoluble form under such conditions without decomposition or other undesired reactions. This considerably restricts the suitable colloids for use with acid catalyst aminoplastics. The water-soluble ethers of cellulose, particularly methyl cellulose, are preferred for such compositions and in fact are the preferred hydrophilic colloids because while they are not as essential with other resins such as alkyd resins, they operate satisfactorily with them and can be used in mixed products containing both aminoplasts and others. The methyl ether of cellulose also has marked emulsifying properties so that it is preferable for this additional reason.

The amount of hydrophilic colloid is not critical and will vary with different emulsions and different film-forming substances. In general, sufficient hydrophilic colloid must be used to produce a stable emulsion capable of being cured to a film of adequate tenacity. Also, the hydrophilic colloid should not be employed in amounts sufficient to adversely affect the strength and water-resistance of the film because even the hydrophilic colloids capable of forming relatively water-insoluble translucent films are not capable of forming films as strong as those produced by the resins, nor are such films as high in water-resistance. The upper limit of the hydrophilic colloid is therefore set by the point at which it begins to adversely affect the film obtained when the emulsion is used for printing or coloring fabrics.

The choice of color is not limited by the necessity of its reaction or affinity to the fiber and in this respect all of the advantages of the emulsions of the prior art are retained. Among the colors which can be used are water-insoluble pigments, water-soluble dyestuffs, and the like. The pigments may be inorganic such as ultramarine, organic pigments such as the phthalocyanines, vats, azoics or lakes, etc. Clear bright prints by dyeings may be obtained showing excellent wash-fastness and resistance to dry cleaning. The degree of fastness, of course, will vary with the film-forming substituents to some extent and with the thoroughness with which the film-forming substance is converted into water and solvent-insoluble form.

The film-forming substituents may in many cases be used without further addition. However, some of the convertible water soluble resins are rather brittle and suitable plasticizers should be employed in such cases for heavy prints. The nature of the plasticizers will be determined by the resin in question and it is an advantage of the present invention that the usual plasticizers for the individual resins can be used and no new techniques are necessary.

The emulsions of the present invention share the advantages of desirable hand which can be obtained by the best emulsions of the prior art. It is possible to produce prints, even fairly heavy prints, without materially increasing stiffness of the fabric. In some cases with heavy prints it may be desirable to incorporate in the emulsion elastomers such as rubber, both natural and synthetic, and various linear polymers showing similar characteristics. The use of elastomers is not claimed as such in the present invention but forms part of the subject matter of the application of Kienle et al., Ser. No. 379,998, filed February 21, 1941, now Patent No. 2,383,937, September 4, 1945. In the present case the use of such substances is claimed only in combination with the emulsions of the present invention in which color and film-forming substituents are present in a continuous aqueous phase.

The solution of film-forming substances in water and the emulsification is sometimes improved by the addition of dispersing or emulsifying agents. In the case of aminoplasts, methyl cellulose is particularly valuable as it forms the dual role of plasticizer for the film-forming substance and emulsifying agent and in a more specific aspect of the present invention, emulsions containing water-soluble aminoplasts and methyl cellulose are claimed.

This invention will be described in greater detail in conjunction with the following specific examples in which the parts are by weight.

Example 1

75 parts of a polyethylene glycol maleate solution containing 83% resin were mixed with 3 parts of oleic acid, 1 part of triethanolamine, and 1 part of lauryl sulfate by means of an exceptionally high speed stirrer. When this mixture became very uniform 46 parts of a liquid aliphatic hydrocarbon were added slowly thereto and the entire mass whipped into a fairly stable emulsion. To this emulsion was then added 1.5 parts of red iron oxide and the agitation continued until the iron oxide was completely dispersed throughout the emulsion. The emulsion was then ground in a Buhrstone paint mill and further agitated. The final stable emulsion was then printed on pigmented rayon, wool and cellulose acetate. After heat treating for 5 minutes at 150° C., the prints in all cases were found to be fast to washing.

Example 2

130 parts of a solution prepared by dissolving 10 parts of the 400 centipoise grade of methyl cellulose in 190 parts of water are mixed with (1) 130 parts of a solution prepared by dissolving 50 parts of dimethoxymethyl urea in 150 parts of water, (2) 20 parts of a suspension of 10 parts of grit-free bentonite in 90 parts of water, and (3) 1.5 parts of an aqueous phosphoric acid solution containing 85% phosphoric acid.

120 parts of the above mixture are mixed by means of a small high-speed stirrer with 21.5 parts of a water-dispersible aqueous paste containing 1.1 parts of very small ultimate particle sized copper phthalocyanine blue pigment and to the resulting mixture are slowly added with stirring 58.5 parts of a petroleum fraction, having a boiling range of 150–210° C. and an aromatic content of about 23%. The resulting oil-in-water emulsion is a stable one of good printing viscosity.

This emulsion is now placed in the paste well of a print machine and applied to an engraved roll. Cotton or any other similar fabric is then passed over the engraved roll and a clear, strong, blue print of excellent hand is obtained. After being dried at a temperature of approximately 50° C. for one-half hour, the print shows remarkable fastness to Wash Test No. 4 of the American Association of Textile Chemists and Colorists (Year Book 1946).

Example 3

A concentrated printing paste or color base is prepared as follows:

50 parts of a water-dispersible, aqueous paste containing 9.5 parts of a thoroughly deflocculated yellow pigment made by coupling 3,3'-dichloro benzidine on acetoacetanilide is mixed by hand stirring with (1) 15 parts of dimethoxymethyl urea (2) 6 parts of a low viscosity grade of methyl cellulose and (3) 29 parts of hot water. The resulting mixture is homogenized by stirring until uniform.

An oil-in-water reducing emulsion is prepared as follows: 180 parts of a solution prepared by dissolving 10 parts of extra high viscosity methyl cellulose in 190 parts of water is mixed with 18 parts of dimethoxy methyl urea and 762 parts of water. 2,040 parts of a petroleum fraction, with a boiling range of 150–210° C. and an aromatic content of about 23% is slowly added to this solution under constant high speed stirring. The emulsion thus formed is homogenized by one passage through a colloid mill. Then 5 parts of an aqueous solution of phosphoric acid containing 85% phosphoric acid is added by simple stirring to each 1000 parts of the homogenized oil-in-water emulsion.

The concentrated color base above described is then mixed with the required quantity of the reducing emulsion in order to obtain the desired depth of shade. As examples, 1 part of the color base may be mixed with 6, 12, 20 or 40 parts of the reducing emulsions by simply stirring the ingredients together. The colored-oil-in-water emulsions thus prepared have good printing viscosities and may be printed on fabrics as described in Example 2. The prints obtained are clean, sharp, strong yellow prints possesssing an excellent hand. When the prints are dried for about one-half hour at approximately 50° C. they develop excellent wash fastness.

Example 4

A concentrated printing paste or color base is prepared as follows:

50 parts of a water-dispersible, aqueous paste containing 10 parts of copper phthalocyanine are mixed by hand stirring with (1) 15 parts of dimethoxymethyl urea, (2) 12 parts of hexaethylene glycol maleate which has been heated in aqueous solution at a temperature of 100° C. for 6 hours, (3) 12 parts of the 15 cps. grade of methyl cellulose and (4) 11 parts of hot water. The resulting mixture is homogenized until uniform.

This concentrated printing paste is usually reduced to the desired depth of shade by mixing with a reducing emulsion as described in Example 2. As for example, 1 part of the color paste is mixed with 1, 6, 12, 20 or 40 parts of the reducing emulsion to produce smooth emulsions of printing viscosity which when applied to fabrics from an engraved copper roll, produce clean, sharp, bright blue designs. These designs, when dried for one-half hour at approximately 50° C., possess a good hand and have excellent resistance to washing.

Example 5

A concentrated printing paste or color base is prepared as follows: 200 parts of a water-dispersible, aqueous paste containing 40 parts of copper phthalocyanine are mixed with (1) 60 parts of trimethylol melamine, (2) 24 parts of the 15 cps. grade of methyl cellulose and (3) 116 parts of water. This mixture is homogenized and then passed through a colloid mill.

An oil-in-water reducing emulsion is prepared as follows: 120 parts of a solution prepared by dissolving 10 parts of extra high viscosity methyl cellulose in 190 parts of water is mixed with 12 parts of dimethoxymethyl urea and 508 parts of water. 1360 parts of a petroleum fraction, with a boiling range of 150–210° C. and an aromatic content of about 23%, is slowly added to the solution described above, while the entire mass is undergoing continuous and vigorous stirring. This emulsion is homogenized by one passage through a colloid mill when 5 parts of an 85% orthophosphoric acid solution is added by simple stirring to each 1000 parts of the homogenized emulsion.

The oil-in-water emulsion is used to obtain pastes of good printing viscosity in a manner similar to that described in the previous examples. When the pastes obtained in this manner are applied to fabrics from an engraved copper roll, clean, sharply defined blue designs are obtained. The resultant printed fabrics are dried for one-half hour at about 50° C. and possess a good hand and excellent wash fastness.

Example 6

A concentrated color paste is prepared as follows: 100 parts of a water-dispersible, aqueous paste containing 20 parts of copper phthalocyanine are mixed with (1) 30 parts of a casein modified urea formaldehyde polymer and (2) 70 parts of a solution prepared by dissolving 60 parts of the 15 cps. grade of methyl cellulose in 290 parts of water. This mixture is homogenized by vigorous stirring until uniform.

Oil-in-water printing emulsions possessing various depths of shade are prepared as follows: 1 part of the above pigmented aqueous solution of polymers is mixed with 6, 12, 20 or 40 parts of the unpigmented acidified oil-in-water emulsion described in Example 5. These printing emulsions are all stable and have good printing viscosity. They give clear, bright blue prints of excellent hand. The prints are dried in an oven at a temperature of approximately 50° C. Then the prints are divided and portions of them are heat treated for one minute at 120° C. Both the heated and the non-heat treated portions of the prints show good fastness to Wash Test No. 4 of the American Association of Textile Chemists and Colorists (Handbook of 1939).

Example 7

A concentrated color base is made as follows: 100 parts of a water-dispersible, aqueous paste containing 20 parts of copper phthalocyanine, are mixed with (1) 30 parts of an aqueous solution of a glycolated, urea formaldehyde polymer containing 42% of polymer and (2) 70 parts of a solution prepared by dissolving 60 parts of the 15 cps. grade of methyl cellulose in 290 parts of water. This mixture is homogenized until uniform.

Oil-in-water printing emulsions for producing prints of various depths of shade are prepared by mixing 1 part of the above pigmented aqueous solution of polymers with, as for example, 6, 12, 20 and 40 parts of the unpigmented acidified oil-in-water emulsion described in Example 5. These printing emulsions are all stable and have good printing viscosity. They give clear, bright blue prints of excellent hand. The prints are dried in an oven at a temperature of approximately 50° C. Then the prints are divided and portions of them are heat-treated for one minute at 120° C. Both the heated and the non-heat treated portions of the prints show good fastness to washing.

Example 8

54.5 parts of a water-dispersible, aqueous paste containing 10 parts of a green pigment obtained by chlorinating copper phthalocyanine are mixed with (1) 25 parts of a solution made by dissolving 48 parts of dimethoxy methyl urea and 16 parts of trimethylol melamine in 36 parts of water, (2) 6 parts of the 15 cps. grade of methyl cellulose and (3) 14.5 parts of hot water. This mixture is homogenized by vigorous stirring until uniform.

An oil-in-water emulsion used with the above pigmented aqueous solution of polymers to produce emulsions of various depths of shade and maintain a printing viscosity, is prepared as follows: First, a concentrate is prepared by kneading the following constituents together: 30 parts of the extra high viscosity methyl cellulose, 60 parts of trimethylol melamine and 20 parts of sulfonated castor oil. 5.5 parts of this concentrate are dissolved in 150 parts of hot water and to this solution are slowly added 342 parts of a petroleum fraction, with a boiling range of 155–265° C. and an aromatic content of 16%, while the mixture is being homogenized by high speed stirring followed by passage through a colloid mill. The resulting oil-in-water emulsion is acidified by adding 2.5 parts of an aqueous solution of phosphoric acid containing 85% phosphoric acid.

Oil-in-water printing emulsions are prepared in a manner similar to that described in Example 2, but using the reducing emulsion prepared according to the procedure given in the preceding paragraph. These printing emulsions are all stable and have good printing viscosity. They give clear, bright, green prints of excellent hand. The prints, when dried and cured, show excellent wash fastness.

Example 9

53 parts of a water-dispersible, aqueous paste containing 10 parts of a yellow pigment made by coupling dichloro benzidine on acetoacetanalide, is mixed with (1) 12 parts of dimethoxymethyl urea (2) 4 parts of trimethylol melamine, (3) 6 parts of the 15 cps. grade of methyl cellulose and (4) 25 parts of hot water. This mixture is homogenized by vigorous stirring until uniform.

An oil-in-water reducing emulsion is prepared as follows: 18 parts of trimethylol melamine is mixed with (1) 180 parts of a solution prepared by dissolving 10 parts of high viscosity methyl cellulose in 190 parts of water and (2) 762 parts of water. 2,040 parts of a petroleum fraction, with a boiling range of 155–265° C. and an aromatic content of about 16%, is slowly added thereto with constant and vigorous stirring. The emulsion is then further homogenized by one passage through a colloid mill.

A colored oil-in-water emulsion is prepared by mixing 20 parts of the color base, 179 parts of the unpigmented emulsion, and 1 part of 85% phosphoric acid. The mixing is accomplished by using vigorous stirring to produce a smooth homogeneous emulsion and then removing excess material by passing the cloth through rubber or other suitable squeeze rollers. The fabrics are colored a uniform bright yellow and, when dried and cured, possess a good hand and good fastness properties. The cloth can then be after-treated by applying thereto a dilute solution of such materials as dimethylol urea or glycolated urea (dimethylol urea treated with ethylene glycol in the presence of an acid catalyst). This treatment is followed by a heating operation whereby the finishing resin is set to the insoluble state. This after-treatment if properly controlled by one familiar with the art, will improve the hand, brightness, washfastness, and resistance to crocking or rubbing of the colored fabric.

*Example 10*

A concentrated printing paste or color base is prepared as follows: 200 parts of a water-dispersible, aqueous paste containing 40 parts of copper phthalocyanine are mixed with 60 parts of dimethoxymethylurea, 24 parts of the 19 cps. grade of methyl cellulose, and 116 parts of water. This mixture is then homogenized on a colloid mill.

An oil-in-water reducing emulsion is prepared as follows: 120 parts of a solution prepared by dissolving 10 parts of the 4000 cps. grade of methyl cellulose in 190 parts of water is mixed with 12 parts of dimethoxymethylurea and 508 parts of water. 1360 parts of a hydrocarbon solvent having a boiling range of 135 degrees C. to 175 degrees C. and an aromatic content of about 92%, is slowly added to the solution described above, while the entire mass is undergoing continuous and vigorous stirring. This emulsion is thoroughly homogenized and 5 parts of 85% orthophosphoric are added by mechanical stirring to each 1000 parts of the emulsion. When blends of the color base with the reducing emulsion are applied to fabrics from an engraved copper roll, clean, sharply defined blue designs are obtained. The resultant printed fabrics are dried for one-half hour at about 50° C. and possess a good hand and excellent washfastness.

*Example 11*

The procedure of Example 10 is followed except that toluene is substituted for the hydrocarbon solvent of Example 10. Toluene is highly volatile and very rapid curing may be used.

*Example 12*

The procedure of Example 10 is followed except that hydrocarbon is replaced by an equal amount of cyclohexane. Very rapid curing takes place. The print, as is the case in the preceding example is of excellent quality and shows a high degree of wash fastness and a good hand.

*Example 13*

The procedure of Example 10 is followed except that hydrocarbon solvent is replaced by an equal amount of 1-nitropropane. The prints obtained are substantially indistinguishable from those of Example 10.

*Example 14*

The procedure of Example 10 is followed but the same quantity of pine oil is substituted for the hydrocarbon solvent. This oil is high boiling and the cure should be effected at temperatures about 100° C. If the lower temperatures of Example 10 are employed a much longer heating is necessary. The print obtained after complete curing shows the same properties of those of Example 10.

*Example 15*

The procedure of Example 10 is followed but the hydrocarbon solvent is replaced by an equal amount of ethyl cyclohexane. The prints obtained show the same properties as those of Example 10.

*Example 16*

The procedure of Example 10 is followed but the hydrocarbon solvent is replaced by an equal amount of octyl acetate. The high boiling point of octyl acetate requires a higher curing temperature. This may be effected in a dryer under the conditions of Example 14, or if desired hot rolls may be used effecting a quick curing of temperature somewhat under 200° C.

*Example 17*

Procedure of Example 10 is followed except that the hydrocarbon solvent is replaced by an equal quantity of ethyl acetate. The prints obtained show the same properties.

*Example 18*

A concentrated color paste is prepared as follows: 76 parts of a water-dispersible, aqueous paste containing 20% of copper phthalocyanine, is mixed with (1) 18 parts of dimethoxymethylol urea and (2) 6 parts of trimethylol melamine. This mixture is stirred with a high-speed stirrer until a smooth paste is obtained.

An oil-in-water reducing emulsion is prepared as follows: 70 parts of a solution prepared by dissolving 10 parts of the 15 cps. grade of methyl cellulose in 90 parts of water is mixed with 25 parts of water. Five parts of an aliphatic petroleum fraction, with a boiling range of 152°–201° C. is slowly added while the entire mass is undergoing continuous and vigorous stirring.

A colored oil-in-water emulsion is prepared by mixing 10 parts of the concentrated color base described above with 89.5 parts of the above reducing emulsion and 0.5 part of an 85% solution of orthophosphoric acid. This emulsion is stable and has good printing viscosity. When this emulsion is applied to fabric from an engraved copper roll, clean, sharply defined blue designs are obtained. The resultant printed fabric is dried for 20 minutes at 80° C. and possesses a good hand and excellent wash fastness.

*Example 19*

An oil-in-water reducing emulsion is prepared as follows: 60 parts of a solution prepared by dissolving 10 parts of the 15 cps. grade of methyl cellulose in 90 parts of water is mixed with 20 parts of water. Twenty parts of an aliphatic petroleum fraction, with a boiling range of 152°–201° C. is slowly added to the solution described above while the entire mass is undergoing continuous and vigorous stirring.

A colored oil-in-water emulsion is prepared by mixing 10 parts of the concentrated color base described in Example 18 with 89.5 parts of the emulsion described above and 0.5 part of an 85% solution of orthophosphoric acid. This printing emulsion is stable and has good printing viscosity. When applied to fabrics from an engraved copper roll, it gives clean, sharply defined designs.

The printed fabric is dried for 20 minutes at 80° C. and possesses a good hand and excellent wash fastness.

Example 20

An oil-in-water reducing emulsion is prepared as follows: 10 parts of a solution prepared by dissolving 10 parts of the 15 cps. grade of methyl cellulose in 90 parts of water are mixed with 30 parts of water. Sixty parts of an aliphatic petroleum fraction, with a boiling range of 152°-201° C., is slowly added to the solution described above while the entire mass is undergoing continuous and vigorous stirring.

A colored oil-in-water emulsion is prepared by mixing 10 parts of the concentrated color base described in Example 18 with 89.5 parts of the above-described emulsion and 0.5 part of an 85% solution of orthophosphoric acid. This printing emulsion is stable and has good printing viscosity. When applied to fabric from an engraved copper roll, clean, sharply defined designs are obtained. The printed fabric is dried for 20 minutes at 80 C. and possesses a good hand and excellent wash fastness.

Example 21

An oil-in-water reducing emulsion is prepared as follows: 5 parts of a solution prepared by dissolving 10 parts of the 15 cps. grade of methyl cellulose in 90 parts of water are mixed with 17 parts of water. Seventy-eight parts of an aliphatic petroleum fraction, with a boiling range of 152°-201° C., are slowly added to the solution described above while the entire mass is undergoing continuous and vigorous stirring.

A colored oil-in-water emulsion is prepared by mixing 10 parts of the concentrated color base described in Example 18 with 89.5 parts of the above-described emulsion and 0.5 part of an 85% solution of orthophosphoric acid. This printing emulsion is stable and has good printing viscosity. When applied to fabric from an engraved copper roll, clean, sharply defined designs are obtained. The printed fabric is dried for 20 minutes at 80° C. and has a good hand and excellent wash fastness.

Example 22

An oil-in-water reducing emulsion is prepared as follows: 65 parts of a solution prepared by dissolving 5 parts of the 3000 cps. grade of methyl cellulose in 95 parts of water is mixed with 20 parts of water. Fifteen parts of an aliphatic petroleum fraction, with a boiling range of 152°-201° C., are slowly added to the solution described above while the entire mass is undergoing continuous and vigorous stirring.

A colored oil-in-water emulsion is prepared by mixing 10 parts of the concentrated color base described in Example 18 with 89.5 parts of the emulsion described above and 0.5 part of an 85% solution of orthophosphoric acid. This printing emulsion is stable and has good printing viscosity. When applied to fabric from an engraved copper roll, clean, sharply defined designs are obtained. The printed fabric is dried for 20 minutes at 80° C. and has a good hand and excellent wash fastness.

Example 23

An oil-in-water reducing emulsion is prepared as follows: 10 parts of a solution prepared by dissolving 5 parts of the 3000 cps. grade of methyl cellulose in 95 parts of water is mixed with 30 parts of water. Sixty parts of an aliphatic petroleum fraction, with a boiling range of 152°-201° C., is slowly added to the solution described above while the entire mass is undergoing continuous and vigorous stirring.

A colored oil-in-water emulsion is prepared by mixing 10 parts of the concentrated color base described in Example 18 with 89.5 parts of the emulsion described above and 0.5 part of an 85% solution of orthophosphoric acid. This printing emulsion is stable and has a good printing viscosity. When applied to fabric from an engraved copper roll, clean, sharply defined designs are obtained. The printed fabric is dried for 20 minutes at 80° C. and has a good hand and excellent wash fastness.

Example 24

An oil-in-water reducing emulsion is prepared as follows: 5 parts of a solution prepared by dissolving 5 parts of the 3000 cps. grade of methyl cellulose in 95 parts of water is mixed with 17 parts of water. Seventy-eight parts of an aliphatic petroleum fraction, with a boiling range of 152°-201° C., is slowly added to the solution described above while the entire mass is undergoing continuous and vigorous stirring.

A colored oil-in-water emulsion is prepared by mixing 10 parts of the concentrated color base described in Example 18 with 89.5 parts of the emulsion described above and 0.5 part of an 85% solution of orthophosphoric acid. This printing emulsion is stable and has a good printing viscosity. When applied to fabric from an engraved copper roll, clean, sharply defined designs are obtained. The printed fabric is dried for 20 minutes at 80° C. and has a good hand and excellent wash fastness.

This application is in part a continuation of our earlier copending application Serial No. 549,630, filed August 15, 1944, now abandoned, which earlier case in turn is in part a continuation of an earlier application Serial No. 417,002, filed October 29, 1941, now abandoned.

We claim:

1. A colored oil-in-water emulsion suitable for printing and coloring of textiles and other fabrics; in which the inner phase consists of a resin-free, water-immiscible organic liquid; the continuous aqueous phase has dispersed therein the color and dissolved therein a thermosetting, amide-formaldehyde resin, a thermoplastic hydrophilic water-soluble acid-stable colloid and an acid catalyst capable of accelerating the conversion of said amide-formaldehyde resin into the insoluble state; the amount of said hydrophilic colloid being sufficient to confer stability on the emulsion and to retain the strength and water resistance of the film formed when fabrics are colored or printed with said emulsion followed by heat treatment; the inner phase of the emulsion amounting to from 4.5 to 70% by weight of the total emulsion, the resin-free volatile organic liquid having substantially no solvent action or reactivity with said amide-formaldehyde resin and being sufficiently volatile at the temperature of transformation of the film-forming substance into the insoluble state so that it is substantially volatilized during such transformation.

2. An emulsion according to claim 1 in which the amide-formaldehyde resin is a melamine-formaldehyde resin.

3. An emulsion according to claim 1 in which the amide-formaldehyde resin is a urea-formaldehyde resin.

4. An emulsion according to claim 3 in which the oil phase consists of a hydrocarbon having low solvent powers for synthetic fibers.

5. An emulsion according to claim 1 in which the thermoplastic hydrophilic acid-stable colloid is methyl cellulose.

6. An emulsion according to claim 1 in which the color is a pigment.

7. An emulsion according to claim 1 in which the oil phase consists of a hydrocarbon having low solvent powers for synthetic fibers.

ROY H. KIENLE.
ALFRED L. PEIKER.

REFERENCES CITED

The following references are of record in the file of this patent:

UNITED STATES PATENTS

| Number | Name | Date |
|---|---|---|
| 2,196,367 | Thackston | Apr. 9, 1940 |
| 2,338,252 | Marberg et al. | Jan. 4, 1944 |
| 2,361,277 | Enderlin et al. | Oct. 24, 1944 |

FOREIGN PATENTS

| Number | Country | Date |
|---|---|---|
| 349,464 | Great Britain | May 26, 1931 |